United States Patent [19]

Donaldson et al.

[11] Patent Number: 4,922,449

[45] Date of Patent: May 1, 1990

[54] BACKPLANE BUS SYSTEM INCLUDING A PLURALITY OF NODES

[75] Inventors: Darrel D. Donaldson, Lancaster; Richard B. Gillett Jr., Westford, both of Mass.

[73] Assignee: Digital Electric Corporation, Maynard, Mass.

[21] Appl. No.: 368,956

[22] Filed: Jun. 13, 1989

Related U.S. Application Data

[63] Continuation of Ser. No. 44,479, May 1, 1987, abandoned.

[51] Int. Cl.$^5$ .............................................. G06F 13/40
[52] U.S. Cl. ............................... 364/900; 364/935.42; 364/935.4
[58] Field of Search ... 364/200 MS File, 900 MS File

[56] References Cited

U.S. PATENT DOCUMENTS

| | | | |
|---|---|---|---|
| 3,585,399 | 6/1971 | Andrews, Jr. | 307/208 |
| 4,024,501 | 5/1977 | Herring et al. | 340/147 R |
| 4,141,068 | 2/1979 | Mager et al. | 364/200 |
| 4,149,241 | 4/1979 | Patterson | 364/200 |
| 4,347,446 | 8/1982 | Price | 307/443 |
| 4,414,480 | 11/1983 | Zasio | 307/443 |
| 4,467,436 | 8/1984 | Chance et al. | 304/513 |
| 4,486,753 | 12/1984 | Saeki et al. | 340/825.91 |
| 4,531,068 | 7/1985 | Kraft et al. | 307/473 |
| 4,550,400 | 10/1985 | Henderson, Jr. et al. | 370/85 |
| 4,550,402 | 10/1985 | Gable et al. | 370/85 |
| 4,567,575 | 1/1986 | Morihisa et al. | 364/900 |
| 4,598,216 | 7/1986 | Lauffer et al. | 307/443 |
| 4,677,566 | 6/1987 | Whittaker et al. | 364/492 |
| 4,691,296 | 9/1987 | Struger | 364/900 |

OTHER PUBLICATIONS

Personal Computer XT and Portable Personal Computer, Technical Reference, 4th Ed., Boca Raton, FL., IBM, 1984, pp. (1-1)to (3-10).
Uffenbeck, "Electrical Characteristics of a Bus", Microcomputers and Microprocessors: the 8080, 8085 and Z-80 Programming, Interfering and Troubleshooting, 1985, pp. 142-160.
CMOS Cookbook, Second Edition, 1988, Howard W. Sams & Co., (Publishers), Don Lancaster (Author) Revised by Howard M. Berlin, pp. 245-247.
Microcomputer Buses and Links, 1986, U.S. Edition Published by Academic Press Inc., D. Del Corso, H. Kirrman and J. D. Nicoud (Authors), pp. 37, 38.
Microprocessors and Microsystems, vol. 10, No. 2, Mar. 1986, Butterworth & Co. (Publishers) Ltd, (London, GB), R. Wilson: "The Physics of Driving Backplane Buses", pp. 61-64.
GB, A, 2175168 (SGS Microelecttronica) 19 Nov. 1986, IBM Technical Disclosure Bulletin, 19 Nov. 1986
IBM Technical Disclosure Bulletin, vol, 25, No. 8, Jan. 1983, (New York, US), A. Jordan, Jr.: "Bus-Protecting Driver with Error Detection", pp. 4100-4102.
Motorola Technical Developments, vol. 5, No. 8, Oct. 1985, Motorola, Inc. (Schumburg, Illinois, US), M. Bluhm: "A High Speed Output Buffer", pp. 54-55.
David B. Gustavson, "Computer Buses-A Tutorial", 1984, p. 9.
VME Bus Specification Manual, Mostek Corp., Motorola, Inc., Signetics/Philips, 1981, pp. 3-1, 3-2, 3-8.

Primary Examiner—Gareth D. Shaw
Assistant Examiner—Kevin A. Kriess
Attorney, Agent, or Firm—Finnegan, Henderson, Farabow, Garrett and Dunner

[57] ABSTRACT

A system for communicating between a plurality of nodes in a computer, each node including logic circuitry for transmitting and receiving data. The subject system includes (1) a backplane bus for carrying the data between the nodes, (2) a driver in each node and a current source circuit coupled to the bus which drive the bus in parallel to decrease the transition time of the data transmitted onto the bus, and (3) coupling resistors individually coupling the bus to the driver in each node and providing impedance matching between the bus and nodes and permitting driver overlap at the bus so that the higher speed and lower power dissipation occurs. In the preferred embodiment, CMOS logic circuitry is utilized and resistors are used to terminate the ends of the bus to the supply voltages.

18 Claims, 6 Drawing Sheets

BACKPLANE BUS SYSTEM INCLUDING A PLURALITY OF NODES

This application is a continuation of application Ser. No. 044,479, filed May 1, 1987, now abandoned.

I. BACKGROUND OF THE INVENTION

The present invention relates to data processing systems and, in particular, to a system bus for use in such systems. The present invention is particularly advantageous in that the subject bus is characterized by high performance, low power consumption and reduced space used for bus logic on a printed circuit board, relative to prior art devices.

In computers and other data processing devices, a bus is commonly employed to interconnect the various elements of the device. For example, a central processing unit is typically connected to memory components, input/output devices, etc. via a bus capable of carrying the signals associated with operation of each element. These signals include, for example, data signals, clock signals and other control signals. The bus must be capable of carrying such signals to all of the components coupled to it so that the desired operation can be carried out by the computer system.

Because the bus is utilized in virtually every operation performed by the computer system, it is a key element whose characteristics have a major impact on overall performance of the system. For example, speed of operation is limited to a degree since many of the signals within the computer must be transmitted via the bus to the appropriate component; thus, the speed at which the bus is capable of responding to and carrying data is a critical consideration.

A further critical aspect of bus operation relates to the consumption of power by the bus. Since the bus is used in nearly every operation, it is important that the bus and associated interface logic consume as little power as possible in its functioning. Prior art attempts to reduce power consumption have usually resulted in slowing down the operating speed of the bus. Conversely, attempts to increase operating speed have typically resulted in undesirable increases in power consumption.

Another problem encountered concerns high-performance bus interface logic which requires large portions of space on a printed circuit board, leaving less space for the functional logic which must also be mounted on the board.

II. SUMMARY OF THE INVENTION

It is an object of the present invention to provide a backplane bus for a computer system that reduces power consumption while simultaneously allowing for high speed operation, and whose bus interface occupies minimal space on the printed circuit board on which it is mounted.

Another object of the invention is to provide such a backplane bus which allows direct use with electronic circuits utilizing CMOS (Complementary Metal Oxide Semiconductor) technology without need for interfacing through non-CMOS devices.

Still another object of the present invention is to increase the number of backplane bus lines used in such a backplane bus so as to permit during each cycle of the bus an increase in the quantity of data transmitted.

A further object of the present invention is to ensure reliable operation of the computer system which incorporates the inventive backplane bus arrangement.

Additional objects and advantages of the invention will be set forth in part in the description which follows and, in part, will be obvious from the description or may be learned by practice of the invention. The objects and advantages of the invention will be realized and attained by means of the instrumentalities and combinations particularly pointed out in the appended claims.

To achieve the objects and in accordance with the purpose of the invention, as embodied and broadly described herein, the system of this invention for transmitting and receiving data between a plurality of nodes comprises a plurality of nodes, each of which includes logic circuitry for transmitting and receiving data, a bus for carrying the data between the nodes, means for individually connecting each of the nodes to the bus, a driver included within the transmitting logic of each node for transmitting data onto the bus, means in each node for coupling the driver to the connecting means for the node, the coupling means reducing driver switching noise and power dissipation, permitting driver overlap at the bus, and for providing impedance matching with the bus, and current source means for the bus for decreasing the transition time of the data transmitted onto the bus.

The accompanying drawings, which are incorporated in and constitute part of this specification, illustrate one embodiment of the invention and, together with the description, serve to explain the principles of the invention.

III. BRIEF DESCRIPTION OF THE DRAWINGS

IV. DETAILED DESCRIPTION OF THE PREFERRED EMBODIMENT

Figure 1:
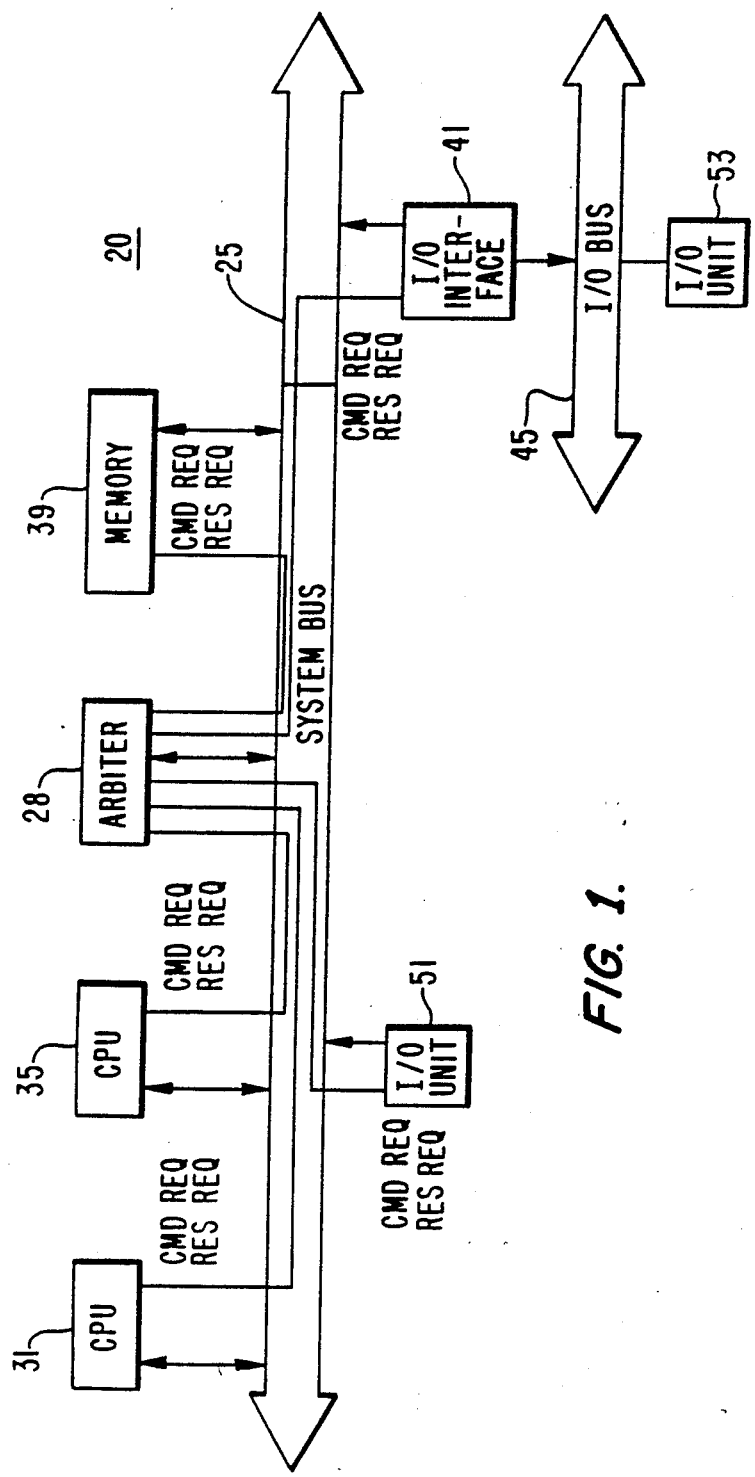
FIG. 1 is a block diagram of a data processing system including a system bus and embodying the present invention.

Reference will now be made in detail to the presently preferred embodiment of the invention, an example of which is illustrated in the accompanying drawings. Throughout the drawings, like reference characters are used to indicate like elements.

The following discussion is divided into two parts: Section A, which provides an overview of the entire data processing system; and Section B, which provides details regarding the invention specific to the instant appended claims.

A. System Overview

FIG. 1 shows an example of a data processing system 20 which embodies the present invention. The heart of system 20 is a system bus 25 which is a synchronous bus that allows communication between several processors, memory subsystems, and I/O systems. Communications over system bus 25 occur synchronously using periodic bus cycles. A typical bus cycle time for system bus 25 is 64 nsec.

In FIG. 1, system bus 25 is coupled to two processors 31 and 35, a memory 39, one I/O interface 41 and one I/O unit 51. I/O unit 53, is coupled to system bus 25 by way of I/O bus 45 and I/O unit interface 41.

A central arbiter 28 is also connected to system bus 25 in the preferred embodiment of data processing system 20. Arbiter 28 provides certain timing and bus arbitration signals directly to the other devices on system bus 25 and shares some signals with those devices.

The implementation shown in FIG. 1 is one which is presently preferred and should not necessarily be interpreted as limiting the present invention. For example, I/O unit 53 could be coupled directly to system bus 25, and arbiter 28 need not operate in the manner described for the present invention.

In the nomenclature used to describe the present invention, processors 31 and 35, memory 39, and I/O interface 41, and I/O device 51 are all called nodes. A "node" is defined as a hardware device which connects to system bus 25. A typical node 60 is shown in greater detail in FIG. 2.

According to the nomenclature used to describe the present invention, the terms "signals" or "lines" are mainly used interchangeably to refer to the names of the physical wires. The terms "data" or "levels" are mainly used to refer to the values which the signals or lines can assume.

Nodes perform transfers with other nodes over system bus 25. A "transfer" is one or more contiguous cycles that share a common transmitter and common arbitration. For example, a read operation initiated by one node to obtain information from another node on system bus 25 requires a command transfer from the first to the second node followed by one or more return data transfers from the second node to the first node at some later time.

A "transaction" is defined as the complete logical task being performed on system bus 25 and can include more than one transfer. For example, a read operation consisting of a command transfer followed later by one or more return data transfers is one transaction. In the preferred embodiment of system bus 25, the permissible transactions support the transfer of different data lengths and include read, write (masked), interlock read, unlock write, and interrupt operations. The difference between an interlock read and a regular or noninterlock read is that an interlock read to a specific location retrieves information stored at that location and restricts access to the stored information by subsequent interlock read commands. Access restriction is performed by setting a lock mechanism. A subsequent unlock write command stores information in the specified location and restores access to the stored information by resetting the lock mechanism at that location. Thus, the interlock read/unlock write operations are a form of read-modify-write operation.

Since system bus 25 is a "pended" bus, it fosters efficient use of bus resources by allowing other nodes to use bus cycles which otherwise would have been wasted waiting for responses. In a pended bus, after one node initiates a transaction, other nodes can have access to the bus before that transaction is complete. Thus, the node initiating that transaction does not tie up the bus for the entire transaction time. This contrasts with a non-pended bus in which the bus is tied up for an entire transaction. For example in system bus 25, after a node initiates a read transaction and makes a command transfer, the node to which that command transfer is directed may not be able to return the requested data immediately. Cycles on bus 25 would then be available between the command transfer and the return data transfer of the read transaction. System bus 25 allows other nodes to use those cycles.

In using system bus 25, each of the nodes can assume different roles in order to effect the transfer of information. One of those roles is a "commander" which is defined as a node which has initiated a transaction currently in progress. For example, in a write or read operation, the commander is the node that requested the write or read operation; it is not necessarily the node that sends or receives the data. In the preferred protocol for system bus 25, a node remains as the commander throughout an entire transaction even though another node may take ownership of the system bus 25 during certain cycles of the transaction. For example, although one node has control of system bus 25 during the transfer of data in response to the command transfer of a read transaction, that one node does not become the commander of the bus 25. Instead, this node is called a "responder."

A responder responds to the commander. For example, if a commander initiated a write operation to write data from node A to node B, node B would be the responder. In addition, in data processing system 20 a node can simultaneously be a commander and a responder.

Transmitters and receivers are roles which the nodes assume in an individual transfer. A "transmitter" is defined as a node which is the source of information placed on system bus 25 during a transfer. A "receiver" is the complement of the transmitter and is defined as the node which receives the information placed on system bus 25 during a transfer. During a read transaction, for example, a commander can first be a transmitter during the command transfer and then a receiver during the return data transfer.

When a node connected to system bus 25 desires to become a transmitter on system bus 25, that node asserts one of two request lines, CMD REQ (commander request) and RES REQ (responder request), which are connected between central arbiter 28 and that particular node. The CMD REQ and RES REQ lines are shown generally in FIG. 1. In general, a node uses its CMD REQ line to request to become commander and initiate transactions on system bus 25, and a node uses its RES REQ line to become a responder to return data or message to a commander. Generally, central arbiter 28 detects which nodes desire access to the bus (i.e., which request lines are asserted). The arbiter then responds to one of the asserted request lines to grant the corresponding node access to bus 25 according to a priority algorithm. In the preferred embodiment, arbiter 28 maintains two independent, circular queues: one for the commander requests and one for the responder requests. Preferably, the responder requests have a higher priority than the commander requests and are handled before the commander requests.

The commander request lines and responder request lines are considered to be arbitration signals. As illustrated in FIG. 1, arbitration signals also include point-to-point conditional grant signals from central arbiter 28 to each node, system bus extend signals to implement multi-bus cycle transfers, and system bus suppression signals to control the initiation of new bus transactions when, for example, a node such as memory is momentarily unable to keep up with traffic on the system bus.

Other types of signals which can constitute system bus 25 include information transfer signals, respond signals, control signals, console/front panel signals, and a few miscellaneous signals. Information transfer signals include data signals, function signals which represent the function being performed on the system bus 25 during a current cycle, identifier signals identifying the commander, and parity signals. The respond signals generally include acknowledge or confirmation signals from a receiver to notify the transmitter of the status of the data transfer.

Control signals include clock signals, warning signals, such as those identifying low line voltages or low DC voltages, reset signals used during initialization, node failure signals, default signals used during idle bus cycles, and error default signals. The console/front panel signals include signals to transmit and receive serial data to a system console, boot signals to control the behavior of a boot processor during power-up, signals to enable modification of the erasable pROM of processors 31, 35 on system bus 25, a signal to control a RUN LIGHT on the front panel, and signals providing battery power to clock logic on certain nodes. The miscellaneous signals, in addition to spare signals, include identification signals which allow each node to define its identification code.

Figure 2:
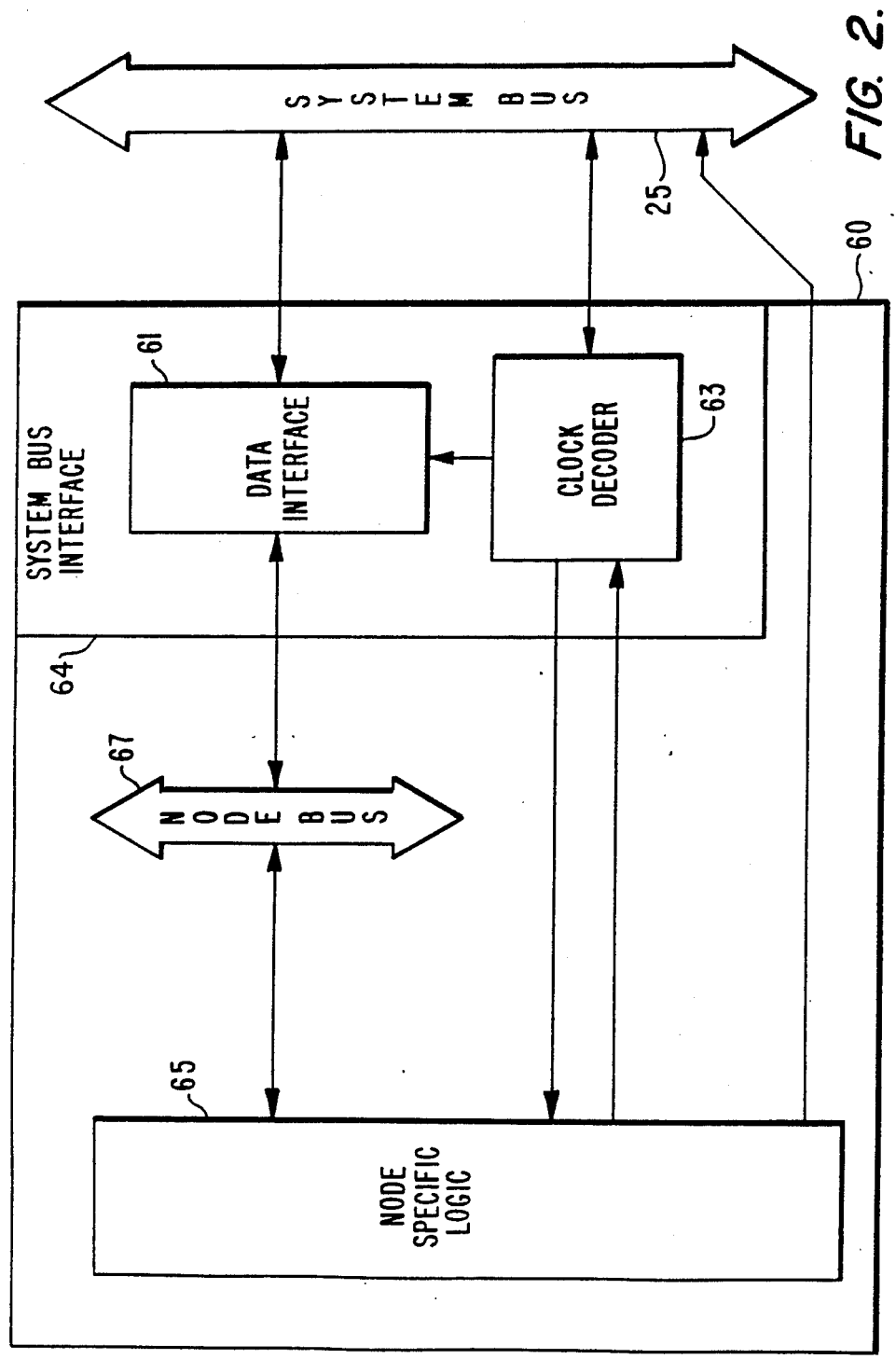
FIG. 2 is a block diagram of a node coupled to a backplane system bus in the data processing system of FIG. 1.

FIG. 2 shows an example of a node 60 connected to system bus 25. Node 60 could be a processor, a memory, an I/O unit or an I/O interface as shown in FIG. 1. In the example shown in FIG. 2, node 60 includes node specific logic 65, a node bus 67, and a system bus interface 64 containing a data interface 61 and a clock decoder 63. Preferably, data interface 61, clock decoder 63, and node bus 67 are standard elements for nodes connected to system bus 25. The node specific logic 65, which uses different integrated circuits from system bus interface 64, preferably includes, in addition to the circuitry designed by a user to carry out the specific function of a node, standard circuitry to interface with the node bus 67. In general, data interface 61 is the primary logical and electrical interface between node 60 and system bus 25, clock decoder 63 provides timing signals to node 60 based on centrally generated clock signals, and node bus 67 provides a high speed interface between data interface 61 and node specific logic 65.

In the preferred embodiment of node 60 and system bus interface 64 shown in FIG. 2, clock decoder 63 contains control circuitry for forming signals to be placed on system bus 25 and processes clock signals received from central arbiter 28 to obtain timing signals for node specific logic 65 and data interface 61. Since the timing signals obtained by clock decoder 63 use the centrally generated clock signals, node 60 will operate synchronously with system bus 25.

Figure 3:
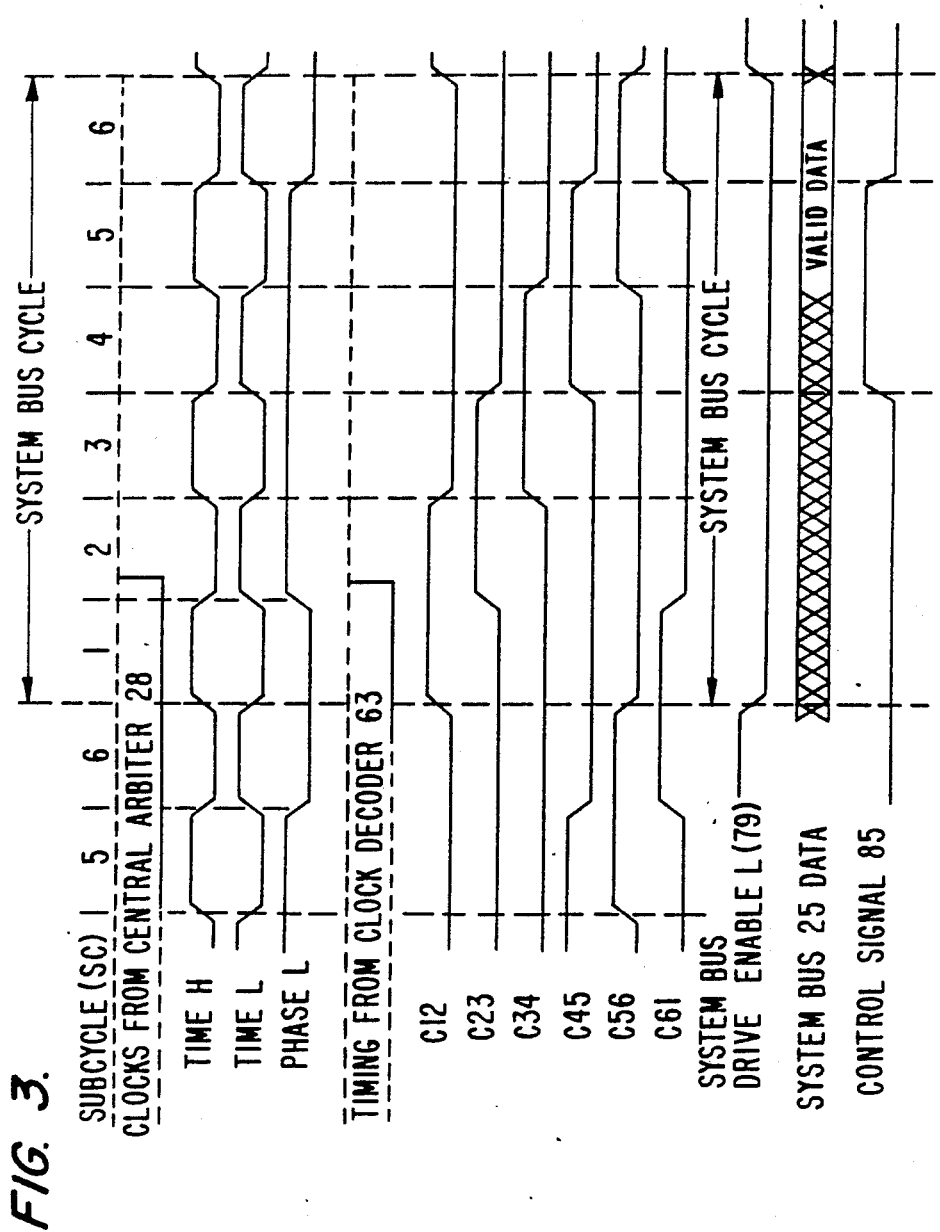
FIG. 3 is a representative timing diagram showing one bus cycle of the data processing system of FIG. 1.

FIG. 3 is a timing diagram showing one bus cycle, the clock signals received by clock decoder 63 from central arbiter 28 (FIG. 1), and certain of the timing signals generated by clock decoder 63. The clock signals received by clock decoder 63 include a Time H signal, a Time L signal, and a Phase signal as shown in FIG. 3. Time H and Time L are inverses of the fundamental clock signals and the Phase signal is obtained by dividing the fundamental clock signal by three. The timing signals generated by clock decoder 63 include C12, C23, C34, C45, C56 and C61, all of which are shown in FIG. 3. Those timing signals required by data interface 61, which occur once per bus cycle, are provided to data interface 61, and a complete set of timing signals, including equivalent ones of the timing signals provided to data interface 61, is buffered and provided to the node specific logic 65. The purpose of buffering is to insure that node specific logic 65 cannot adversely affect the operation of the system bus interface 64 by improperly loading the timing signals. Clock decoder 63 uses the clock signals to create six subcycles for each bus cycle and then uses the subcycles to create the six timing signals CXY, where X and Y represent two adjacent subcycles which are combined to form one timing signal.

Each node in the system bus 25 has its own corresponding set of timing signals generated by its clock decoder 63. While nominally the corresponding signals occur at exactly the same time in every node throughout the system 20, variations between clock decoder 63 and other circuitry in multiple nodes introduce timing variations between corresponding signals. These timing variations are commonly known as "clock skew."

Figure 4:
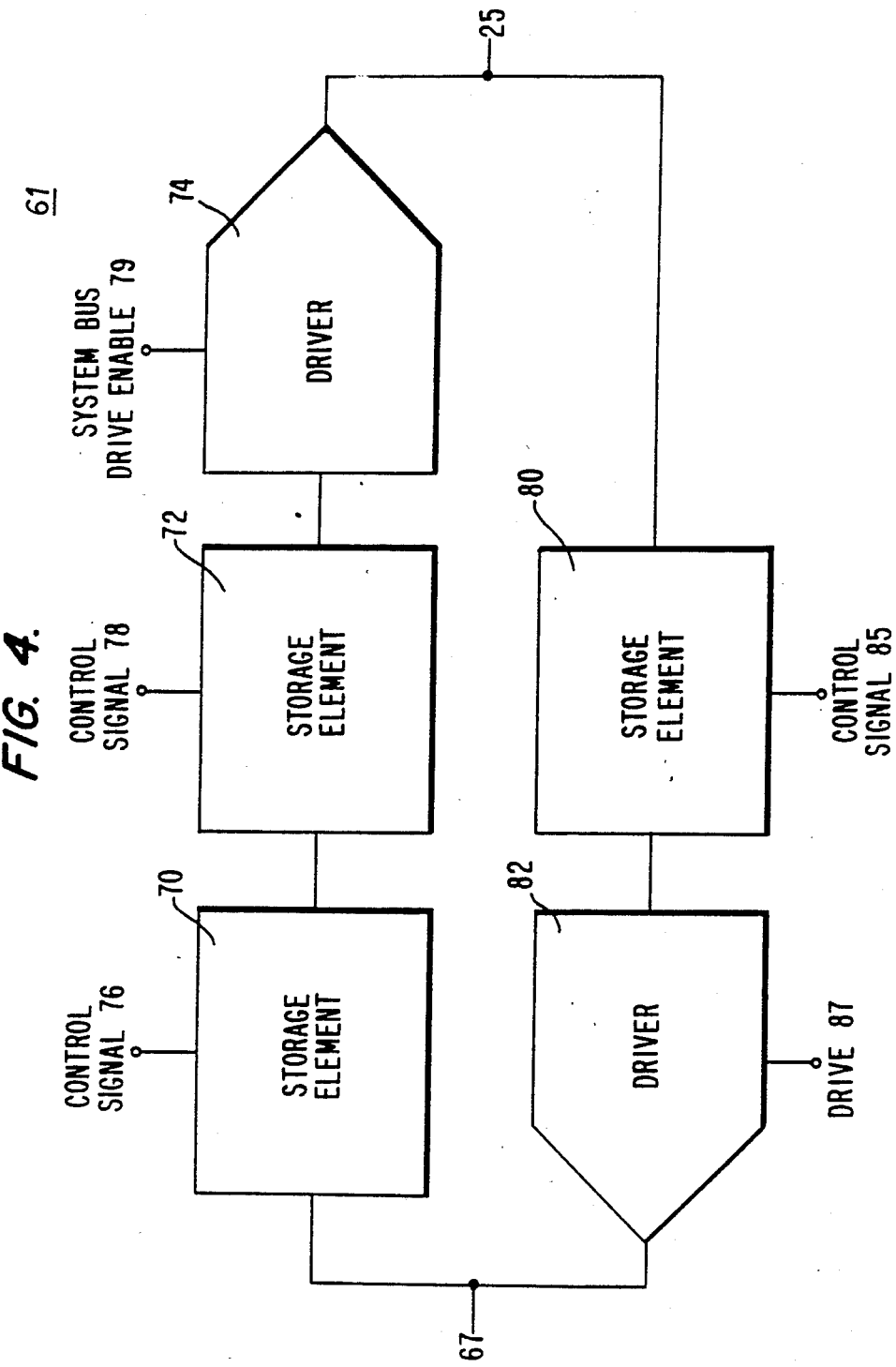
FIG. 4 is a block diagram of the data interface used in the nodes of FIGS. 1 and 2.

FIG. 4 shows a preferred embodiment of data interface 61. Data interface 61 contains both temporary storage circuitry and bus driver circuitry to provide a bidirectional and high speed interface between each of the lines of node bus 67 and each of the lines of system bus 25. As shown in FIG. 4, data interface 61 preferably includes storage elements 70 and 72 and system bus driver 74 to provide a communication path from node bus 67 to system bus 25. Data interface 61 also includes storage element 80 and node bus driver 82 to provide communication path from system bus 25 to node bus 67. As used in the description of data interface 61, the term "storage element" refers generally to bistable storage devices such as transparent latch or a master-slave storage element, and not to a specific implementation. Persons of ordinary skill will recognize which types of storage elements are appropriate.

As shown in FIG. 4, storage element 70 has an input connected to receive data from node bus 67 and an output connected to the input of storage element 72. The output of storage element 72 is connected to an input of system bus driver 74 whose output is connected to system bus 25. Storage elements 70 and 72 are controlled by node bus control signals 76 and 78, respectively, which are derived from the timing signals generated by clock decoder 63. Storage elements 70 and 72 provide a two-stage temporary storage for pipelining data from node bus 67 to system bus 25. Different numbers of storage stages can also be used.

System bus driver 74 is controlled by system bus drive enable 79. According to the state of the system bus drive enable 79, the input of system bus driver 74 either is coupled to its output, thereby transferring the data at the output of storage element 72 to system bus 25, or decoupled from that output. When system bus drive enable 79 decouples the input and output of the system bus driver 74, system bus driver 74 presents a high impedance to system bus 25. The system bus drive enable 79 is also generated by clock decoder 63 in accordance with clock signals received from system bus 25 and control signals received from the node specific logic 65.

Storage element 80 has an input terminal connected to system bus 25 and an output terminal connected to an input of node bus driver 82. The output of node bus driver 82 is connected back to node bus 67. Storage element 80, preferably a transparent latch, is controlled by a system bus control signal 85 which is derived from the timing signals generated by clock decoder 63. A node bus drive signal 87 controls node bus driver 82 similar to the manner in which system bus drive signal 79 controls system bus drive 74. Thus, in response to node bus driver signal 87, node bus driver 82 either couples its input to its output or decouples its input from its output and provides a high impedance to node bus 67.

In order to explain how data is transferred over system bus 25, it is important to understand the relationship between system bus drive enable 79 and control signal 85. In the present embodiment, this relationship is shown in FIG. 3. System bus drive enable 79 is nominally driven from the beginning to the end of a bus cycle. The new data become available for receipt from system bus 25 at some time later in the bus cycle after driver propagation and bus settling time has occurred. In the present embodiment, storage element 80 is a transparent latch. Control signal 85 is logically equivalent to clock C45. The bus timing assures that system bus 25 data is available for receipt sometime prior to the deassertion of control signal 85. Storage element 80 stores bus data that is stable at least a set-up time prior to the deassertion of control signal 85 and remains stable a hold time after the deassertion of control signal 85.

Node bus 67 is preferably a very high speed data bus which allows bidirectional data transfer between the node specific logic 65 and system bus 25 by way of data interface 61. In the preferred embodiment of node 60 shown in FIG. 2, node bus 67 is an interconnect system consisting of point-to-point connections between the system bus interface 64 and the node specific logic 65. In accordance with the present invention, however, there is no requirement for such a point-to-point interconnection.

Figure 5:
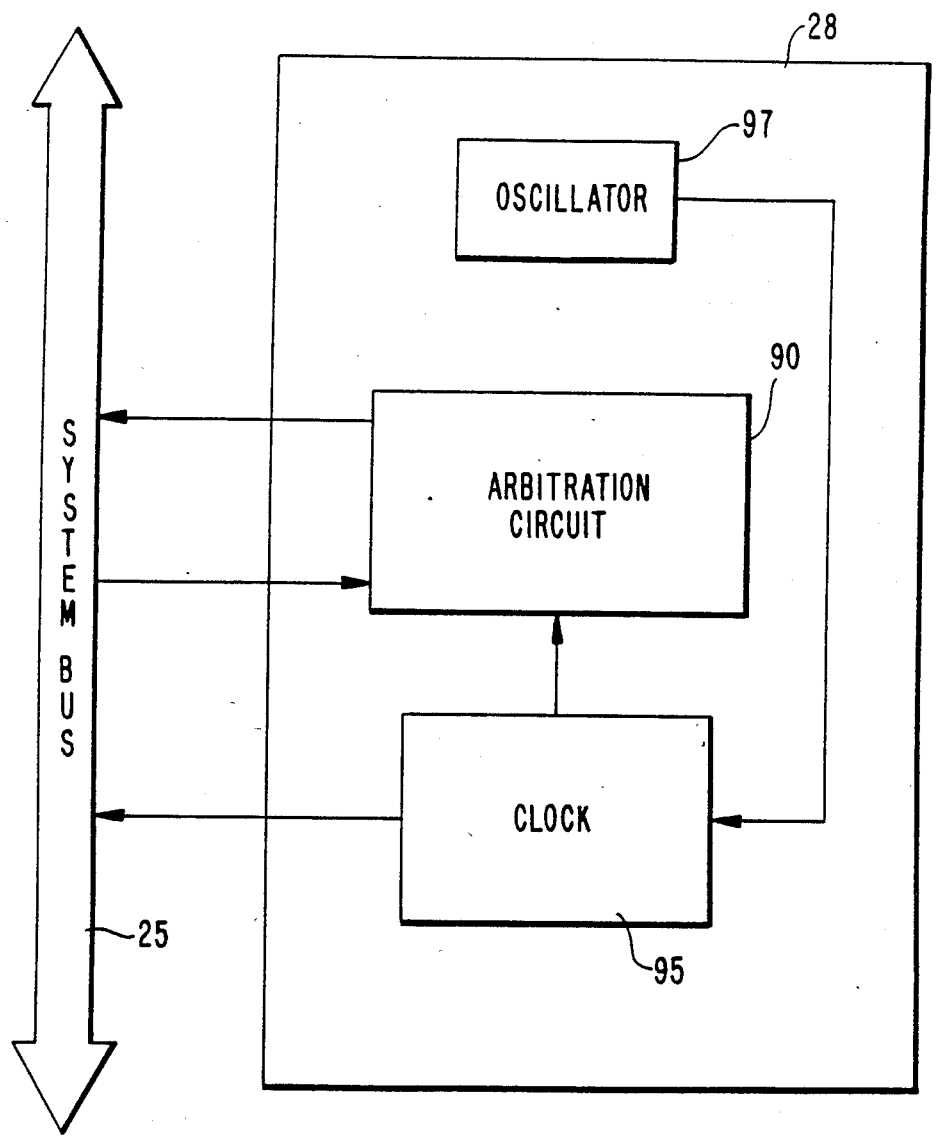
FIG. 5 is a block diagram of a central arbiter of the data processing system of FIG. 1.

FIG. 5 shows a preferred embodiment of the central arbiter 28 which is also connected to system bus 25. Central arbiter 28 provides the clock signals for system bus 25 and grants ownership of the bus to the nodes on system bus 25 which request ownership of that bus. Central arbiter 28 preferably includes an arbitration circuit 90, a clock circuit 95, and a oscillator 97. Oscillator 97 generates the fundamental clock signals. Clock 95 provides timing signals for arbitration circuit 90 and the basic Time H, Time L, and Phase clock signals for timing on system bus 25. Arbitration circuit 90 receives the commander and responder request signals, arbitrates conflicts between nodes desiring access to system bus 25, and maintains the queues referred to above for the commander and responder requests. Arbitration circuit 90 also provides certain control signals to clock 95.

B. The Subject Invention

Figure 6:
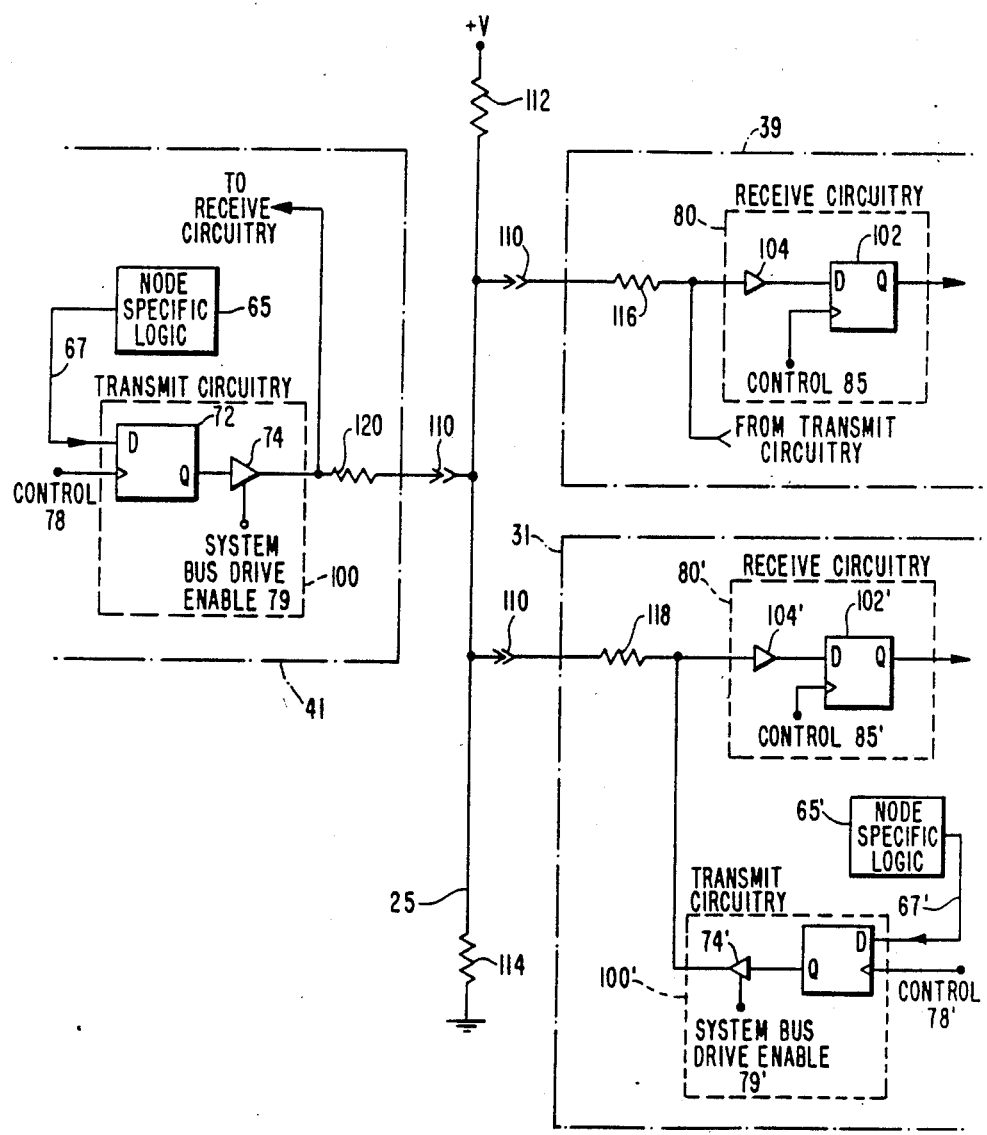
FIG. 6 is a block diagram of a backplane system bus and exemplary nodes of the data processing system of FIG. 1.

The present invention will now be explained in detail with particular reference to the preferred embodiment thereof which is illustrated in FIG. 6. As stated previously, like reference characters are used throughout the drawings to indicate like elements. Thus, where an element has been previously identified and discussed, such details will not be repeated in this section. Instead, reference should be had to the previous discussion of that element.

In accordance with the present invention, a system is provided for transmitting and receiving data between a plurality of nodes, each node including logic circuitry for transmitting and receiving the data, the logic circuitry being operable from first and second supply voltages. According to a preferred embodiment as illustrated in FIG. 6, the nodes are identified by reference characters 31, 39 and 41 which are examples of the various nodes depicted in FIG. 1 and discussed above. It should be appreciated, however, that these nodes are merely exemplary of various nodes which can be coupled to the bus 25; thus, no limitation regarding the type of node is intended by the ones illustrated in FIG. 6. As shown, each node has the capability of both transmitting and receiving data.

The nodes 39, 31 and 41 include logic circuitry 80, 80', 100 and 100' which are adapted to operate from first and second supply voltages. Since CMOS technology is employed in the node circuitry for transmitting and receiving data via the bus 25, these supply voltages may correspond to 0 and +5 volts, respectively.

Logic circuitry 80 and 80' each comprises, according to the presently preferred embodiment, a CMOS storage element latch 102 (or 102') and a CMOS driver 104 (or 104'). These logic circuits are arranged so as to receive data for further processing and, thus, the output of drivers 104, 104' is coupled to the input of latches 102, 102' which are connected to control signals 85, 85' previously described. The output of latches 102, 102' is subjected to further processing, also as described previously.

Logic circuitry 100 of node 41 is adapted, in the illustrated exemplary embodiment, to transmit data to other devices, e.g., logic circuitry 80, 80' of nodes 39, 31. Logic circuitry 100' is similarly adapted to transmit data to such other nodes. This logic circuitry includes, in accordance with the present invention, a driver for transmitting data onto the bus. As embodied herein, transmitting circuitry 100,100' includes drivers 74,74' at their respective outputs. These drivers are preferably CMOS tri-state drivers. A driver is included in the logic of each transmitting circuitry in each node connected to the bus.

Circuitry 100 and 100' are also preferably and respectively comprised of a CMOS storage element or latch 72,72' and control circuitry, such as node specific logic 65,65' connected by node bus 67,67'. For ease of description, storage element 70 (FIG. 4) has been omitted from FIG. 6. The input of latch 72,72' is connected to logic 65,65' so as to receive data to be transmitted to other devices within the computer system, while the clock of latch 72,72' is coupled to control 78,78' respectively, as described previously. The output of latch 72,72' is respectively coupled to the input of driver 74,74' which has a tri-state control, and is connected to Drive signal 79,79' in the manner described above. Driver 74,74' provides a high impedance to the bus 25 when Drive signal 79,79' respectively is inactive.

While not shown in FIG. 6, the devices contained within each of logic circuitry 80, 80', 100 and 100' are operable from first and second supply voltages. In the case of CMOS logic, for example, such supply voltages may correspond to +5 and 0 volts, respectively. These arrangements are well-known in the art and need not be described further for purposes of understanding the present invention. Additionally, it should be appreciated that supply levels other than 0 and +5 volts may be utilized without departing from the spirit or scope of the invention.

In accordance with the present invention, a bus is provided for carrying data between the nodes. As embodied herein, the bus is indicated in FIG. 6 by reference character 25 and may comprise wire, etch or some other conductor suitable for carrying data present in computer systems. Also according to the invention, a plurality of means are provided to facilitate interconnection between bus and the nodes. As embodied herein, a connector 110 is connected between each node and the bus 25. In this manner, the bus may be disposed in a fixed position in the computer system while the nodes are selectively coupled thereto by appropriately plugging each node into a corresponding one of connectors 110. Such an arrangement is commonly referred to as a "backplane system," with bus 25 being known as a "backplane system bus."

According to the invention, current source means are provided for the bus for decreasing the transition time of the data transmitted onto the bus. As embodied in FIG. 6, the current source means includes a first resistor 112 and a second resistor 114. Resistor 112 is preferably connected between a first end of bus 25 and the first supply voltage, +V, which may be +5 volts in the case of CMOS devices. Resistor 114 is preferably connected between a second end of bus 25 and the second supply voltage, which may be ground as depicted in FIG. 6.

In the presently preferred embodiment, resistors 112 and 114 are effectively used to terminate the ends of bus 25 such that the bus accelerates the transition between data levels to decrease transition times, as later explained. Thus, other arrangements and equivalent circuits may be employed in lieu of the illustrated resistors to achieve this function.

Also according to the invention, means are provided in each node for individually coupling its driver to the connecting means for the nodes, the coupling means providing impedance matching between the bus and the nodes so that driver switching noise is reduced and lower power dissipation occurs in the drivers. As illustrated in FIG. 6, the coupling means are identified by reference characters 116, 118 and 120. In the preferred embodiment, each of these means comprises a coupling resistor for coupling nodes 39, 31 and 41, respectively, to bus 25. As explained in detail hereinafter, the use of these coupling resistors permits driver overlap to occur at bus 25.

With respect to the receive circuitry 80, 80' of nodes 39, 31, coupling resistors 116 and 118 are individually coupled between bus 25 and the input of receivers 104, 104', respectively. With respect to the transmit circuitry 100, 100' of nodes 41, 31, coupling resistors 120, 118 are respectively coupled between bus 25 and the output of tri-state drivers 74, 74'. According to the presently preferred embodiment, coupling resistors 116, 118 and 120 are each disposed separately, i.e., externally, to respective drivers 104, 104', 74 and 74'. Further, each of coupling resistors 116–120 preferably has a resistance that is several times, e.g., two to twenty times, the impedance of its corresponding CMOS driver. Additionally, the value of resistors 112 and 114 is selected to be several times, e.g. approximately five times, the value of coupling resistors 116–120.

To fully appreciate the operation and concommitant advantages of a backplane bus according to the present invention, reference is made to a bus in which the following components are utilized: logic circuits 80, 80', 100 and 100' include CMOS drivers 104, 104', 74 and 74' having an impedance in the range of 2 to 10 ohms; resistors 112 and 114 are each 150 ohm, 1% tolerance resistors; and coupling resistors 116, 118 and 120 are each within the range of 20 ohms to 40 ohms, preferably 30 ohm, 1% tolerance resistors. The supply voltage used is +5 volts, referenced to ground.

In operation, data generated, such as by node specific logic 65 described previously, are transmitted to bus 25 by transmit circuitry, such as logic circuitry 100 of node 41. These data, in the case of CMOS logic using 0 and +5 volts, are of a digital nature having recognizable low and high threshold levels established in the present embodiment at 2.0 volts and 3.0 volts, respectively. Such data are carried on bus 25 and are received by circuits 80 and 80', for example, which undertake further processing on or as a result of the received data. The advantages associated with the present invention lie in the manner in which the foregoing exchange of data takes place.

Specifically, the foregoing arrangement provides for superior matching between the bus and the nodes connected to it. Firstly, there is a matching in the technology used in that the need for converting from CMOS logic to other logic (such as TTL) to achieve satisfactory data transmission is eliminated. This achieves a reduction in circuitry required and in various associated costs. Secondly, there is substantial matching of the impedance of the nodes with that of the bus. In the aforedescribed embodiment, the impedance of each node is approximately 30 ohms while the impedance of the bus is in the vicinity of 30 to 60 ohms, i.e., only one to two times greater. This impedance matching allows for better communication of data between the bus and the nodes with minimal reflection and waste of the energy in the signals.

Use of coupling resistors 116, 118 and 120 which are external to the corresponding drivers 104, 104', 74 and 74' also provides several advantages. The CMOS manufacturing process can alter the impedance of CMOS drivers virtually anywhere within the range of 2 to 10 ohms. When this impedance is summed with the higher resistance (30 ohms) of the respective coupling resistor, any variation due to the CMOS manufacturing process is essentially eliminated. This results in a much more consistent driver output impedance.

Because of the greater resistance of coupling resistors 116–120 relative to their respective CMOS drivers, power dissipated within a node connected to bus 25 will chiefly be dissipated via coupling resistors 116–120 rather than drivers 104, 104', 74 or 74'. The shifting of the power dissipation burden from the drivers to the coupling resistors permits more drivers to be implemented in a single integrated circuit package, thus reducing the board area required for the bus interface logic. Placing more drivers in the same package however results in increased noise on the chip power and ground references due to the higher di/dt of the current through the inductances in the power and ground circuits of the package. Traditionally this problem has been solved by using more pins on the package for power and ground. These additional power and ground pins necessitate the use of higher pin count packages which in turn require more space on the printed circuit board for the bus interface logic. The use of coupling resistors 116, 118, and 120 reduce by a factor of 5 to 10 this di/dt and therefore the noise induced on the power and ground references, circumventing the need for additional power and ground pins.

In prior art designs, the timing of the control signals on the bus assured that there was never a situation when more than one driver was driving the bus at the same time. Otherwise, it was possible that driver damage would result due to excessive output currents. At a minimum, high levels of di/dt noise would be generated. In the past, the multiple-driver condition has been avoided by providing a non-overlap time between the end of the drive time for the previous bus driver and the beginning of the drive time for the next driver. This need for non-overlap time increases bus cycle time. The current invention provides a novel solution for reducing bus cycle time by allowing the drive times of the drivers to overlap, yet at the same time avoids the problems of the prior art such as the risk of driver damage or the generation of excessive noise levels. These benefits are the result of the coupling resistors which limit the overlap current between any two overlapping drivers to an acceptable level. Thus, by permitting driver overlap the portion of the bus cycle time that traditionally was allotted for non-overlap time can be removed, thereby reducing the bus cycle time and increasing performance of the system.

As mentioned previously, the CMOS logic embodied here interprets 2.0 volts and lower as a low level and 3.0 volts and higher as a high level. In most prior art devices, buses are employed which swing data levels from one power supply level to the other, i.e., from 0 volts to +5 volts for a total swing of 5 volts. In a bus according to the present invention, the combined voltage divider effect of resistors 112 and 114 with coupling resistors 116–120 causes a reduction in this swing, i.e., from about 0.8 volt to about 4.2 volts for a total swing of about 3.4 volts. Since dynamic power dissipation is proportional to voltage squared, this improvement in swing correlates to a relative reduction in dynamic power dissipation from 25 (5 squared) to 12 (3.4 squared), or about a 2:1 savings.

Resistors 112 and 114 as stated earlier provide a current source for decreasing the overall transition time of the bus data from one state to another. To achieve this reduction in transition time, this current source acts in parallel with the driver in the transmitter which is providing data on the bus. The provision of this current source thus substantially increases the speed at which the bus can be cycled and thereby increases system performance. Specifically, in this embodiment, resistors 112 and 114 create a Thevenin equivalent circuit of 75 ohms connecting the system bus to a nominal 2.5 volts. To illustrate the effect of this equivalent circuit on bus speed, the equivalent circuit should be considered in conjunction with the coupling resistors 116–120. Combined, the equivalent circuit and coupling resistors serve to establish nominal high voltage, voh, and nominal low voltage, vol, levels on the system bus 25 of about 4.2 volts and 0.8 volt, respectively. Since any transition from vol to the high threshold (here nominally 3.0 volts) or from voh to low threshold (here nominally 2.0 volts) passes through the 2.5 volt level, the equivalent circuit aids the transition by sourcing current for approximately 75% of the transition time, thus decreasing the time required to make the transition.

In the present embodiment, variations which occur in the drivers, coupling resistors and current source resistors considered together cause voh and vol only to vary slightly from their nominal values. The worst-case voh and vol values are approximately 3.7 and 1.3 volts, respectively. These worst-case values assure an adequate minimum noise margin of at least 0.7 volt for both logic levels. Noise margin is the difference between the appropriate receiver input threshold and the driver output voltage. Adequate noise margins are important for reliable system operation and the present invention meets this requirement.

While FIG. 6 illustrates bus 25 as being a single conductor, it should be appreciated from the foregoing description that multiple or parallel buses can be utilized so as to accommodate data having multiple bits. For example, computer systems having up to 77 parallel bits of data have been constructed using backplane bus arrangements according to the present invention. That is, 77 buses each being of the type illustrated in FIG. 6 are provided in parallel to accommodate the 77 bits of information contained in the data to be carried on the buses. Additional buses can also be provided to accommodate other data, such as common clocks and control data, which are needed by the system.

Also as discussed previously, the bus is preferably constructed so as to have connectors 110 which permit nodes 31, 39 and 41 to be selectively plugged therein. In this manner, various nodes can be connected to bus 25 in order to provide the particular computer system desired by the user. Conversely stated, the nodes can be provided on "boards" such as printed circuit cards suitable for plugging into connectors 110. This arrangement is shown diagrammatically in FIG. 6 by the dot-dash lines individually surrounding each of nodes 31, 39 and 41. Such arrangements are well known in the art and need not be further explained here for purposes of understanding the present invention.

It will therefore be apparent to those skilled in the art that various modifications and variations can be made in the apparatus of the present invention. Thus, it is intended that the specification and drawings be considered as exemplary only, with the true scope and spirit of the invention being indicated by the following claims.

What is claimed is:

1. A system for transmitting and receiving data between a plurality of nodes via a bus, comprising:

a bus having a current source;

a plurality of nodes, more than one node being capable of driving the bus simultaneously to transfer data, the nodes supplying together with the current source of the bus current for the transfer of data such that during such transfer of data the state of the bus transitions between one predetermined voltage level and another predetermined voltage level;

means for individually connecting each of said nodes to the bus;

a driver in each node designed to supply current to the bus in parallel with the current source for the transfer of data;

coupling resistor means in each node for coupling its driver to the connecting means for such node, and during occasions when such node is driving the bus to one predetermined voltage level simultaneously with at least another of the plurality of nodes driving the bus to another predetermined voltage level, for limiting the current flowing through its driver and avoiding damage to said driver.

2. A system as recited in claim 1 wherein said driver in each node is a tri-state driver.

3. A system as recited in claim 2 further comprising logic circuitry in each node for transmitting and receiving data via the bus, and wherein the tri-state driver in each node is coupled to the logic circuitry.

4. A system as recited in claim 1 wherein said coupling resistor means in each node is a coupling resistor having a predetermined resistance value for limiting said current flowing through said driver during such occasions and chosen also to terminate the bus.

5. A system as recited in claim 4 wherein the coupling resistor in each node acts in conjunction with the current source of the bus to limit the transactions of the bus to the predetermined voltage levels.

6. A system as recited in claim 5 wherin the coupling resistor in each node is about 20 to 40 ohms.

7. A system for transmitting and receiving data between a plurality of nodes via a bus, comprising:
- a bus having a current source which establishes a nominal voltage level absent any node driving the bus;
- a plurality of nodes, more than one node being capable of driving the bus simultaneously to transfer data, the nodes supplying together with the current source of the bus current for the transfer of data such that during such transfer of data the state of the bus transitions between a first predetermined voltage level and a second predetermined voltage level passing through said nominal voltage level;
- means for individually connecting each of said nodes to the bus;
- a driver in each node designed to supply current to the bus in parallel with the current source for the transfer of data;
- a coupling resistor in each node for coupling its driver to the connecting means for such node, each coupling resistor having a predetermined resistance value chosen to limit the current flowing through its driver to avoid damage to its driver during occasions when such node is driving the bus to the first predetermined voltage level simultaneously with at least another of the plurality of nodes driving the bus to the second predetermined voltage level.

8. A system as recited in claim 7 wherein the driver in each node is a tri-state driver.

9. A system as recited in claim 8 wherein the tri-state driver in CMOS.

10. A system as recited in claim 9 further comprising logic circuitry in each node for transmitting and receiving data via the bus, and wherein the tri-state driver in each node is coupled to the logic circuitry.

11. A system for transmitting and receiving data between a plurality of nodes via a bus, comprising:
- a bus having a current source;
- a plurality of nodes, more than one node being capable of driving the bus simultaneously to transfer data, the nodes supplying together with the current source of the bus current for the transfer of data such that during such transfer of data the state of the bus transitions between one predetermined voltage level and another predetermined voltage level;
- means for individually connecting each of said nodes to the bus;
- logic circuitry in each node for transmitting and receiving data via the bus;
- a driver in each node coupled to the logic circuitry and designed to supply current for the data transfer in parallel with the current source of the bus, such that the current flowing through such driver is at an acceptable level;
- linear resistive means, having a predetermined resistance value, in each node for coupling its driver to the connecting means for such node and, during occasions when such node is driving the bus to one predetermined voltage level simultaneously with at least another of the plurality of nodes driving the bus to another predetermined voltage level, for preventing the current flowing through its driver from exceeding said acceptable level so as to avoid damage to its driver.

12. A system as recited in claim 10, wherein said coupling resistor means comprises a coupling resistor.

13. A system as recited in claim 10, wherein said current source comprises a resistor connected between said bus and said one predetermined voltage level.

14. A system as recited in claim 10, wherein said bus has two ends, and said current source comprises first and second resistors and first and second supply voltages, said first resistor connecting one end of said bus to said first supply voltage and said second resistor connecting the other end of said bus to said second supply voltage.

15. A system as recited in claim 12, wherein said bus has two ends, and said current source comprises first and second resistors and first and second supply voltages, said first resistor connecting one end of said bus to said first supply voltage and said second resistor connecting the other end of said bus to said second supply voltage.

16. A system as recited in claim 15 wherein said driver is CMOS.

17. A system for transmitting and receiving data between a plurality of nodes via a bus, comprising:
- a bus having two ends and a current source, said current source comprising first and second resistors and first and second supply voltages, said first resistor connecting one end of said bus to said first supply voltage and said second resistor connecting the other end of said bus to said second supply voltage;
- a plurality of nodes, more than one node being capable of driving the bus simultaneously to transfer data, the nodes supplying together with the current source of the bus current for the transfer of data such that during such transfer of data the state of the bus transitions between one predetermined voltage level and another predetermined voltage level;
- means for individually connecting each of said nodes to the bus;
- a CMOS tri-state driver in each node designed to supply current to the bus in parallel with the current source for the transfer of data;
- a coupling resistor, having a predetermined resistance value, in each node for coupling its CMOS tri-state driver to the connecting means for such node, and during occasions when such node is driving the bus to one predetermined voltage level simultaneously with at least another of the plurality of nodes driving the bus to another predetermined voltage level, for limiting the current flowing through its tri-state driver and avoiding damage to said driver; said coupling resistor in each node acting in conjunction with the current source of the bus to limit the transitions of the bus to the predetermined voltage levels, the predetermined resistance value of the coupling resistor being also chosen to terminate the bus; and logic circuitry in each node for transmitting and receiving data via the bus, and wherein the CMOS tri-state driver in each node is coupled to the logic circuitry.

18. A system for transmitting and receiving data between a plurality of nodes via a bus, comprising:

a bus having a current source;

a plurality of nodes, more than one node being capable of driving the bus simultaneously to transfer data, the nodes supplying together with the current source of the bus current for the transfer of data such that during such transfer of data the state of the bus transitions between one predetermined voltage level and another predetermined voltage level;

means for individually connecting each of said nodes to the bus;

logic circuitry in each node for transmitting and receiving data via the bus;

a tri-state driver in each node coupled to the logic circuitry and designed to supply current for the data transfer in parallel with the current source of the bus, such that the current flowing through such driver is at an acceptable level;

a coupling resistor, having a predetermined resistance value, in each node for coupling its tri-state driver to the connecting means for such node and, during occasions when such node is driving the bus to one predetermined voltage level simultaneously with at least another of the plurality of nodes driving the bus to another predetermined voltage level, for preventing the current flowing through its tri-state driver from exceeding said acceptable level so as to avoid damage to its tri-state driver.

* * * * *

UNITED STATES PATENT AND TRADEMARK OFFICE
CERTIFICATE OF CORRECTION

PATENT NO. : 4,922,449
DATED : May 01, 1990
INVENTOR(S) : Darrel Donaldson et al.

It is certified that error appears in the above-identified patent and that said Letters Patent is hereby corrected as shown below:

Claim 5, column 13, line 10, change "transactions" to --transistions--.

Claim 9, column 13, line 46, change "in" to --is--.

Signed and Sealed this

Sixth Day of August, 1991

Attest:

HARRY F. MANBECK, JR.

*Attesting Officer*  *Commissioner of Patents and Trademarks*

UNITED STATES PATENT AND TRADEMARK OFFICE
CERTIFICATE OF CORRECTION

PATENT NO. : 4,922,449

DATED : May 01, 1990

INVENTOR(S) : Darrel Donaldson et al.

It is certified that error appears in the above-identified patent and that said Letters Patent is hereby corrected as shown below:

Claim 12, column 14, line 13, change "claim 10" to --claim 2--.

Claim 13, column 14, line 15, change "claim 10" to --claim 2--.

Claim 14, column 14, line 18, change "claim 10" to --claim 2--.

Signed and Sealed this

Sixth Day of April, 1993

Attest:

STEPHEN G. KUNIN

*Attesting Officer*   Acting Commissioner of Patents and Trademarks